Aug. 11, 1931.  J. C. MORRELL  1,818,240
PROCESS FOR IMPROVING FUEL AND AIR MIXTURES
FOR INTERNAL COMBUSTION ENGINES
Filed Aug. 25, 1927   2 Sheets-Sheet 2
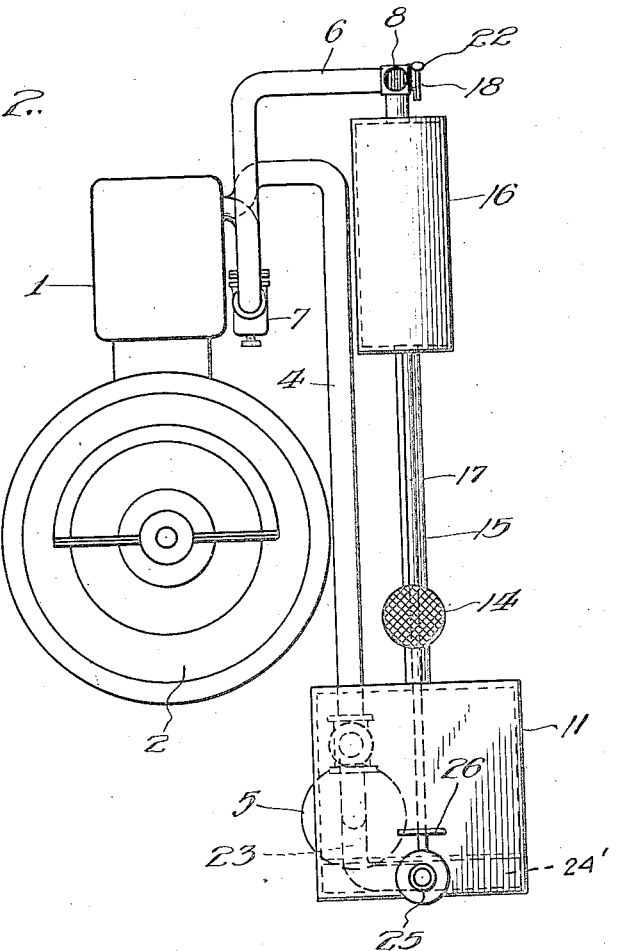
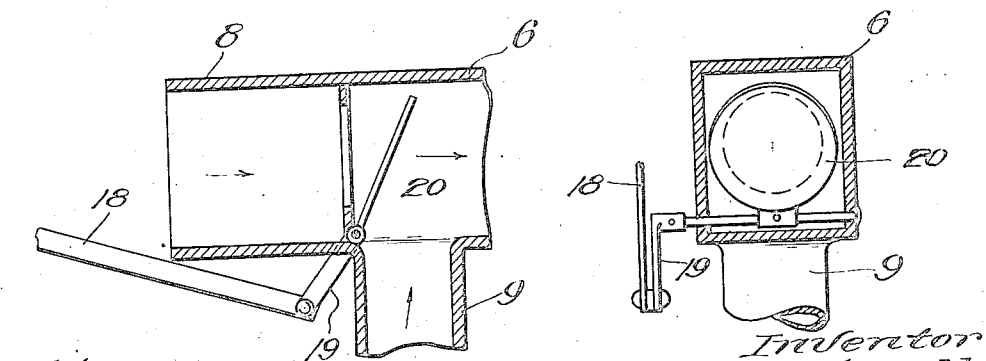

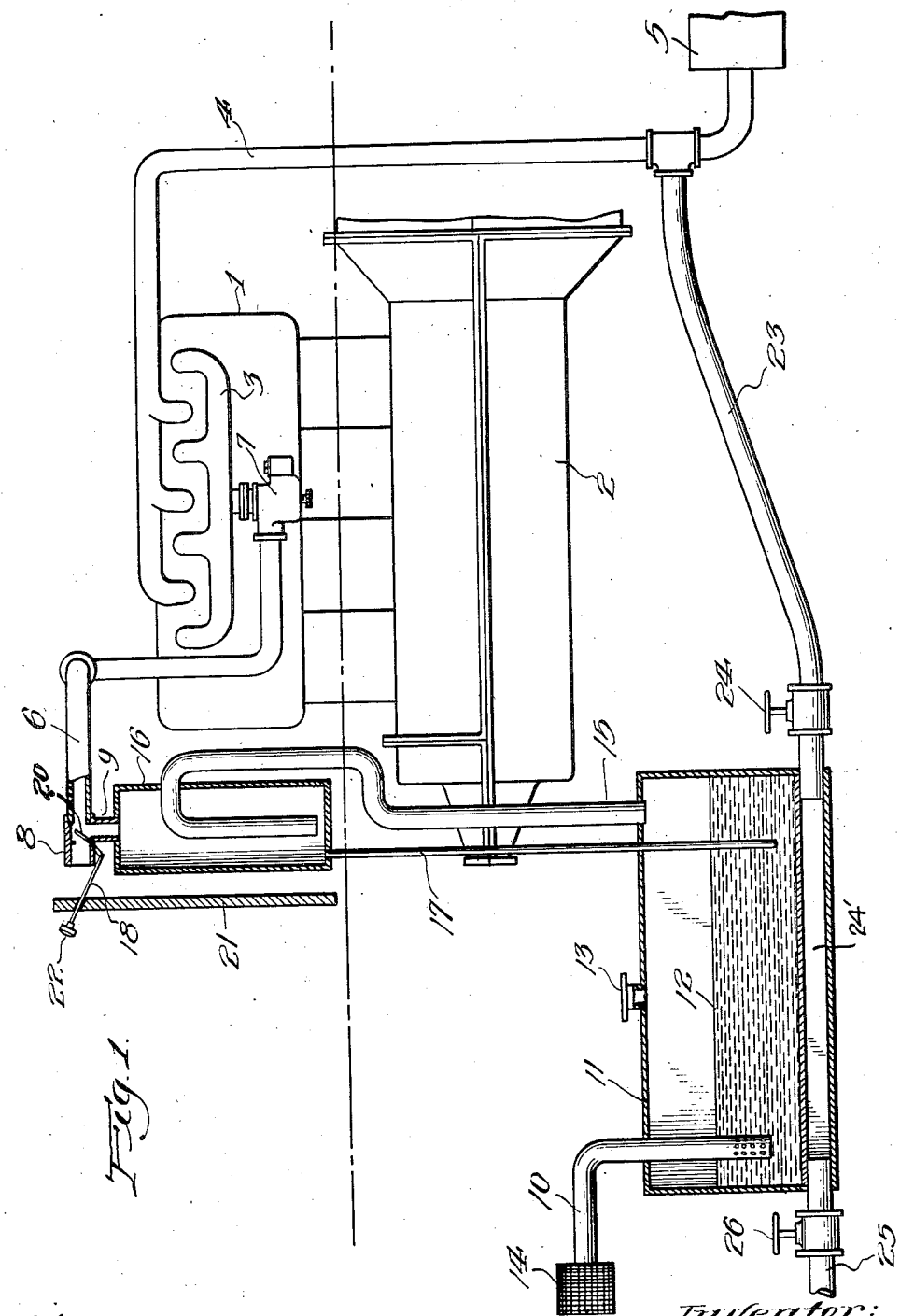

Patented Aug. 11, 1931

1,818,240

UNITED STATES PATENT OFFICE

JACQUE C. MORRELL, OF OAK PARK, ILLINOIS

PROCESS FOR IMPROVING FUEL AND AIR MIXTURES FOR INTERNAL COMBUSTION ENGINES

Application filed August 25, 1927. Serial No. 215,270.

This application is in part a continuation of Serial No. 747,895, filed November 5th, 1924.

In my prior application a process was described for the introduction of a motor fuel conditioner to bring about smoother and more efficient operation of internal combustion engines, for example, an automobile motor. The principle of this process comprised the passage of the air used for combustion in the internal combustion engine through or in contact with a body or mass of liquid containing water. The purpose of this was to conveniently introduce water vapor and other fuel conditioners mentioned therein into the fuel and air mixture so as to improve the operation of the motor.

A feature of the invention described in said application comprised the introduction of freeze retarding agents into the water, which freeze retarding agents were divided into two classes, (1) nonvolatile, in which case the freeze retarding agent functioned simply to prevent or delay freezing of the water during cold weather, and (2) a volatile freeze retarding agent, which functions at the same time as a motor fuel conditioner.

The present application is a specific improvement on the generic idea described and claimed in said application, and particularly contemplates causing regulated portions of the air introduced to support combustion to pass through or in contact with a body containing said motor fuel conditioner, whereby portions of the motor fuel conditioner will be carried along by the air. The mixture of air and motor fuel conditioner may be then subsequently passed through the carburetor or other means for mixing the air and motor fuel, and finally into the cylinders of the internal combustion engine.

In recent years manufacturers and marketers of gasoline-like motor fuels have been perfecting motor fuels which either in themselves or by the addition of "dope" possessed high anti-knock or anti-detonating properties. The present invention is particularly directed to produce the same beneficial results in an entirely different manner. According to the practice of the present invention, the motor fuel conditioner which imparts desired anti-knock properties to the motor fuel is carried by the air used for combustion and combined in the carburetor or other mixing device. This is an economical and very practical method of incorporating said anti-knock compounds and comprises one of the objects of the present invention.

The concept of the present invention is particularly applicable to internal combustion engines operating under high pressure, and it is within the scope of the invention to utilize high boiling point hydrocarbons as motor fuel, since the introduction of anti-knock substances into the vaporous mixture going to the internal combustion engine will prevent the usual knocking attendant upon the use of lower gravity and higher boiling point hydrocarbons. The use of this high boiling point hydrocarbon in a high compression motor is very desirable from an economical standpoint, as high compression means high power efficiency.

The utility of the invention as well as other objects and advantages will be more apparent from the following description:

In the drawings, Fig. 1 is a diagrammatic elevational view partly in vertical section illustrating an internal combustion engine equipped with apparatus for accomplishing the objects of the present invention.

Fig. 2 is a front view of the construction shown in Fig. 1.

Fig. 3 is an enlarged fragmentary cross-sectional view illustrating the mechanism for controlling the amount of air used as the carrier.

Fig. 4 is a front view of the construction shown in Fig. 3.

Referring more in detail to the drawings, 1 designates the casting of an internal combustion engine provided with a crank case 2, intake manifold 3 and exhaust manifold 4, which latter may be provided with a conventional type muffler, illustrated in fragmentary form at 5. Air may be introduced through the line 6 into a conventional type carburetor or mixing device, illustrated diagrammatically at 7. The air inlet pipe 6 is fed by means of the pipes 8 and 9. The carburetor or other mixing device may be of any standard make provided with gas inlet, drain, in connection with the inlet manifold. It may be provided, of course, with an adjusting valve for the purpose of permitting regulation of the mixture to make it richer or leaner.

Describing now one of the features of the present invention, regulated portions of the air used for combustion may be introduced through the inlet pipe 10 which terminates within the chamber 11. The chamber 11 is adapted to contain a supply of motor fuel conditioner which may comprise a wide variety of substances or compounds, or mixtures thereof, as will be hereinafter more particularly described. The numeral 12 designates diagrammatically a liquid body of such conditioner maintained in the chamber 11. The chamber may be provided with the inlet 13 whereby the chamber 11 may be replenished from time to time. It is to be particularly noted that while the lower end of the pipe 10 has been shown immersed in the body of liquid 12, yet it will be understood that the lower end of this pipe 10 may terminate above the liquid level 12. In other words, the invention contemplates that the air introduced to the chamber 11 may pass through or in contact with the motor fuel conditioner maintained in said chamber.

A filter 14 may be mounted on the inlet end of the air line 10 for the purpose of scrubbing the air and removing impurities prior to introduction into the chamber 11. The air after passing through or in contact with the motor fuel conditioner in the chamber 11 passes upwardly through the pipe 15 into a separator 16, the separator 16 communicating at its upper end with the pipe 9 heretofore described. The air passing up through the pipe 15 will carry with it portions of the motor fuel conditioner in substantially vaporous form. Such mixture passes into the separator 16 where any liquid portions will be separated and prevented from passing through the pipe 6 into the carburetor 7. These separated liquid portions may be returned through the line 17 to the chamber 11.

Describing now another feature of the present invention, it is to be noted that the pipe 10 is in free communication with the atmosphere at its inlet end. If it should be desired to vary the amount of air which is brought into contact with the motor fuel conditioner, this may be readily accomplished by manipulation in an obvious manner of the lever 18 having pivotal connection with the link 19, which in turn communicates with a valve 20, which valve is mounted in the junction between the inlet pipes 8 and 9 to the main air inlet pipe 6. This control of the amount of air permitted to be brought into contact with the motor fuel conditioner is important, since depending upon atmospheric conditions, the type of motor fuel being used and the type of motor, it may be desirable to either decrease or increase the amount of air permitted to pass in contact with the motor fuel conditioner. By means of the device illustrated in Fig. 3, this may be readily controlled by the operator. The lever 18 preferably passes through the dash illustrated conventionally at 21, the operator merely pushing or pulling on the handle 22 attached to the stem 18.

The air containing the motor fuel conditioner leaves separator 16 and passes through pipes 9 and 6 into carburetor or other mixing device 7 where the motor fuel is admixed with the air and the motor fuel conditioner from which the mixture is fed to the intake manifold 3. A portion of the exhaust gases may be diverted through line 23, in which may be interposed a valve 24, and introduced into the lower portion 24' of the chamber 11 below the liquid pool of motor fuel conditioner. In this manner, it is possible to utilize some of the heat of the exhaust gases to impart heat to the motor fuel conditioner. The exhaust gases are removed from the chamber 11 through the line 25 controlled by valve 26.

The purpose of the motor fuel conditioner is principally to reduce knocking in the motor. This knocking is evidenced by a pinging or metallic noise which, according to our present knowledge, is caused by an uneven burning of motor fuel. One of the theories advanced to explain this knocking is that after ignition the wave front of the burning gases compresses the unburned gases ahead, and when the pressure and temperature of the unburned gases exceed a certain point a sharp explosion occurs, which is evidenced by knocking. The motor fuel conditioner avoids this condition and permits smooth and even burning. It is well known, of course, that knocking in a motor cuts down power and increases fuel consumption. It prevents operation at high compression because as the compression pressure or compression ratio of the motor is increased the knocking tendency also increases. Hence, the elimination of knocking by the use of a motor fuel conditioner permits the motor to be operated at higher compression pressure, thus bringing about increased power, increased mileage and increased efficiency of the motor. The use of a motor fuel conditioner also permits hill climbing without gear shifting and cuts out knocking in acceleration. The utility of the present invention should, therefore, be obvious.

There are a great many substances which have been suggested as anti-knock materials. Some of these substances are miscible with a motor fuel while others are not. No one, to the applicant's present knowledge, has invented a practical method of utilizing immiscible types and the present invention particularly allows utilization of such types as well as miscible types. It is to be understood, of course, that it is within the scope and purpose of the present invention to utilize all types of motor fuel conditioners, as the principle upon which the present invention is based does not need to consider the physical relationship between the motor fuel conditioner and the motor fuel.

For example, water cannot be mixed with gasoline, and while some have attempted to incorporate water in the form of emulsions, it has not yet reached a practical or feasible stage. The same holds for other immiscible conditioners. It is to be noted that I use the term "immiscible" to include insoluble substances.

It is not the purpose of the present invention to utilize or claim any particular anti-knock substances or motor fuel conditioner, but rather to cover broadly the process and apparatus for incorporating a motor fuel conditioner or anti-knock, anti-detonating substance in the air or motor fuel conditioner before same enters the combustion chamber or cylinders.

Some examples of motor fuel conditioners were listed in the application of which this is a continuation in part. Water is mentioned and organic substances and other anti-knock substances in general were listed. As specific examples of the latter, alcohol was pointed out, as well as ammonia, aniline, inorganic iodine and other compounds. In the present invention more examples will be given to illustrate the wide scope of the invention.

Ethyl alcohol may be used as a motor fuel conditioner as well as the other alcohols, such as propyl, butyl, and other members of this general group. It is contemplated to use not only the normal and the primary, secondary and tertiary alcohols, but also the branch chain alcohols.

As further examples, derivatives of alipathic hydrocarbons may be mentioned, including the group from ethyl to amyl iodides. The amines have been considered as good anti-knock substances, and it is proposed to utilize the amines corresponding to the above radicals, as well as other suitable amines of the primary, secondary and tertiary classes. Various derivatives of the amines may also be considered, for example, the quaternary ammonium bases, and in general derivatives of ammonia, such as the alkyl ammonium iodides may be used.

It is proposed also to use suitable esters, which are the products of reaction between alcohols and acids, or groups containing alcohol derivatives.

Some of the alcohol derivatives of metals, sometimes referred to as alkides, may also be used, the only condition being that they must be volatile. Various derivatives of the aromatic hydrocarbons, such as benzene, toluene and xylene may be used as anti-knock agents or motor fuel conditioners. Examples of these are anilines, toluidines and xylidines, which may also be classified as aromatic amines or substitution products of ammonia. Aromatic compounds with side chains containing iodine or benzene in which the iodine is in the ring, and analogous or similar aromatic derivatives with side chains and substituted hydrogens in the ring may be used. Some phenols have given good results. In like manner chemical derivatives of the olefines and the naphthenes, as well as naphthalene and anthracene possessing anti-detonating qualities may be used. Nitrogen bases such as pyridine may also be used. Methyl, ethyl, dimethyl and diethyl anilines and diphenyl amine are good anti-detonators. Aromatic alcohols are also anti-detonators, for example, benzyl alcohol.

Oxidation products of alcohol, or compounds which bear a similar relationship, such as ketones and derivatives of these products and compounds such as aldehyde ammonia and aldols are being considered. It is contemplated using also the organo-metallic anti-knock compounds or derivatives.

The dihydroxy compounds known as the glycols possess freeze retarding properties, and where the vapor pressure is such as to permit their incorporation in the air passing through the liquid in the air they will have a beneficial effect upon the motor fuel.

In general it is the purpose here to utilize anti-detonating materials principally of that chemical composition and structure known as organic compounds, including the hydrocarbons of the various groups and chemical derivatives therefrom. Naturally a great many inorganic substances, such as iodine, hydrogen iodide, ammonia, etc., either alone or dissolved in water may be used.

It is believed that a sufficient number of examples have been given to indicate the broad scope of the invention. It is further within the scope and purpose of the invention to have suitable mixtures of these inorganic substances, for example, it may be desirable to incorporate certain derivatives like iodine derivatives with alcohol, or utilize water-soluble materials in solution in water, and in general where such mixtures are used, the cheaper substances should be selected as solvents for those more expensive and more highly detonating in order to obtain a better distribution and proportion of the anti-knock material.

It may be well to here repeat that it is not the purpose of the invention to claim specifically the use of these organic substances as anti-detonating materials, but the concept of the invention comprises a process and apparatus by which these anti-detonating substances are introduced into the air used for combustion in regulated proportions, said air being used as a carrier to subsequently incorporate said anti-detonating materials into the fuel mixture passing to the combustion chamber or cylinders of an internal combustion engine.

It is understood, of course, that the illustration in the drawing is highly diagrammatic and that many changes may be made within the scope of the invention. For instance, the separator 16 may be dispensed with and the pipe 15 may communicate directly with the pipe 9. Liquid level drawoff cocks may be provided on the side of the chamber 11 for ascertaining the height of liquid within the tank. In other words, the mechanical instrumentality illustrated in the drawing for accomplishing the purpose of the invention may be modified without departing from the spirit of the invention.

I believe that I am the first to disclose a practical method and apparatus whereby the benefit of motor fuel conditioners, particularly those possessing desirable anti-knock or anti-detonating properties may be realized by utilizing the air as a carrier for introducing the same as a motor fuel conditioner, and the invention has particular utility in the use of desirable compounds normally immiscible or insoluble with the particular type of hydrocarbon used as a motor fuel. The invention contemplates the use of any type of motor fuel conditioner introduced in an efficient and practical manner.

The term "entrained" as used in the specification and claims is to be defined and interpreted to cover the condition where the motor fuel conditioner is present in small particles in the air as well as a condition where the motor fuel conditioner is volatilized in the air and carried as a vapor.

The term "non-solid" as used in the claims is to be defined as meaning that the compound may normally be a solid or a liquid but has been converted to non-solid state by solution or other means. By the term "non-aqueous" compounds is meant compounds serving as anti-knock agents which do not depend for their anti-knock properties upon the water which may be used as a carrying agent.

I claim as my invention:

1. A process of the character described, which comprises subjecting regulated quantities of air to direct contact with a non-aqueous compound in non-solid state posessing anti-knock properties to cause said air to carry entrained therein quantities of such compound, then mixing said air containing said entrained compound with motor fuel to produce a combustible vapor and subsequently passing said vapor to the cylinders of an internal combustion engine during normal operation thereof.

2. A process such as claimed in claim 1, characterized in that the amount of air used as a carrier for said compound is controlled by the operator.

3. A process such as claimed in claim 1, characterized in that the amount of air necessary to support combustion in the internal combustion engine is divided and only a portion thereof used as a carrier for said compound.

4. A process for incorporating compounds having desirable anti-knock properties in motor fuel mixtures for use in internal combustion engines, which comprises during normal operation of an internal combustion engine bringing regulated portions of the air used for supporting combustion into contact with said compound in non-solid state, whereby said compound is entrained with said air and said air is used as a carrier, then mixing said air with motor fuel to form a combustible vapor, and subsequently utilizing said combustible vapor as a motor fuel.

5. A process for incorporating non-aqueous compounds having desirable anti-knock properties in motor fuel mixtures for use in normally operating internal combustion engines, which comprises bringing regulated portions of the air used for supporting combustion into contact with said compound in non-solid state, whereby said compound is entrained with said air and said air is used as a carrier, then mixing said air with motor fuel to form a combustible vapor, and subsequently utilizing said combustible vapor as a motor fuel.

6. A process for incorporating compounds having desirable anti-knock properties, in motor fuel mixtures for use in normally operating internal combustion engines, which comprises bringing regulated portions of the air used for supporting combustion into contact with said compound in non-solid state, whereby said compound is entrained with said air and said air is used as a carrier, then mixing said air with motor fuel not previously mixed with an amount of air which would be sufficient to produce a combustible vapor, and subsequently utilizing said combustible vapor as a motor fuel.

In testimony whereof I affix my signature.

JACQUE C. MORRELL.